United States Patent
Eschenfelder et al.

(10) Patent No.: US 6,730,251 B1
(45) Date of Patent: May 4, 2004

(54) METHOD OF USE OF MULTI-PURPOSE PROCESSING APPARATUS

(75) Inventors: Kurt Eschenfelder, West Bend, WI (US); Loren R. Johansen, Chanhassen, MI (US); Michael D. McElhatton, Kewaskum, WI (US); Michael Ruminski, West Bend, WI (US)

(73) Assignee: Serigraph Inc., West Bend, WI (US)

( * ) Notice: Subject to any disclaimer, the term of this patent is extended or adjusted under 35 U.S.C. 154(b) by 0 days.

(21) Appl. No.: 10/086,081

(22) Filed: Feb. 27, 2002

Related U.S. Application Data

(62) Division of application No. 09/411,292, filed on Oct. 4, 1999, now Pat. No. 6,497,567.

(51) Int. Cl.[7] .......................... B29C 45/14; B29C 70/78
(52) U.S. Cl. ................... 264/153; 264/250; 264/254; 264/259; 264/266; 264/297.2; 264/163
(58) Field of Search ................. 264/153, 155, 264/163, 510, 511, 513, 259, 266, 245–247, 255, 275, 294, 296, 297.2, 297.8; 425/112, 121, 126.1, 129.1

(56) References Cited

U.S. PATENT DOCUMENTS

| | | |
|---|---|---|
| 3,141,196 A | 7/1964 | Langecker |
| 3,651,191 A | 3/1972 | Glatt et al. |
| 3,752,629 A | 8/1973 | Gordon |
| 3,832,102 A | 8/1974 | Alroy |
| 4,184,831 A | 1/1980 | Hegler et al. |
| 4,252,762 A | 2/1981 | Stevenson |
| 4,368,027 A | 1/1983 | Lorgéet al. |
| 4,474,719 A | 10/1984 | Sander |
| 4,519,972 A | 5/1985 | Stevenson |
| 4,565,513 A | 1/1986 | Kiefer |
| 4,639,341 A | 1/1987 | Hanamoto et al. |
| 4,643,789 A | 2/1987 | Parker et al. |
| 4,650,533 A | 3/1987 | Parker et al. |
| 4,696,636 A | 9/1987 | Evely |
| 4,837,075 A | 6/1989 | Dudley |
| 4,883,419 A | 11/1989 | Queirel |
| 4,917,927 A | 4/1990 | Sakaitani et al. |
| 4,994,224 A * | 2/1991 | Itoh et al. .................... 264/247 |
| 5,040,962 A | 8/1991 | Waszeciak et al. |
| 5,085,571 A | 2/1992 | Congleton |
| 5,098,633 A | 3/1992 | Hausler |
| 5,108,530 A | 4/1992 | Niebling, Jr. et al. |
| 5,162,123 A | 11/1992 | Grimes |
| 5,162,124 A | 11/1992 | Hausler et al. |
| 5,182,065 A | 1/1993 | Piotrowski et al. |

(List continued on next page.)

*Primary Examiner*—Angela Ortiz
(74) *Attorney, Agent, or Firm*—William K. Baxter; Godfrey & Kahn, S.C.

(57) ABSTRACT

A method of using a multi-purpose processing apparatus for simultaneously performing an injection molding operation and a cutting/forming operation. The multi-purpose apparatus places a forming operation into unused space within the injection molding machine, thereby utilizing the already present injection molding clamping pressure to pressure form parts. The apparatus results in a method that combines the three steps of forming, cutting, and injection molding into one continuous operation performed within the injection molding machine, as well as eliminating the need for numerous pre-injection molding steps.

6 Claims, 2 Drawing Sheets

U.S. PATENT DOCUMENTS

| | | |
|---|---|---|
| 5,196,152 A | 3/1993 | Gamache et al. |
| 5,198,283 A | 3/1993 | Hausler et al. |
| 5,217,563 A | 6/1993 | Niebling et al. |
| 5,227,222 A | 7/1993 | Ogawa et al. |
| 5,252,393 A | 10/1993 | Kagota et al. |
| 5,264,172 A | 11/1993 | Rosica et al. |
| 5,284,608 A | 2/1994 | Vismara |
| 5,420,761 A | 5/1995 | DuNah et al. |
| 5,424,017 A | 6/1995 | Hinduja et al. |
| 5,462,421 A | 10/1995 | Stein et al. |
| 5,512,226 A | 4/1996 | Rosica et al. |
| 5,514,317 A | 5/1996 | Rosica et al. |
| 5,603,889 A * | 2/1997 | Ohno .......................... 264/510 |
| 5,707,581 A * | 1/1998 | Yamazaki ................... 264/511 |
| 5,776,411 A * | 7/1998 | Miyazawa et al. .......... 264/511 |
| 5,800,771 A * | 9/1998 | Ohno .......................... 264/510 |
| 5,837,086 A * | 11/1998 | Leeb et al. .................. 156/245 |
| 5,885,499 A | 3/1999 | Aksberg |
| 5,910,283 A | 6/1999 | Hobson |
| 5,925,302 A * | 7/1999 | Oono et al. .................. 264/267 |
| 5,989,480 A * | 11/1999 | Yamazaki ................... 264/511 |
| 6,045,738 A * | 4/2000 | Atake ......................... 264/266 |
| 6,102,686 A | 8/2000 | Eschenfelder |
| 6,497,567 B1 * | 12/2002 | Eschenfelder et al. ...... 425/127 |

* cited by examiner

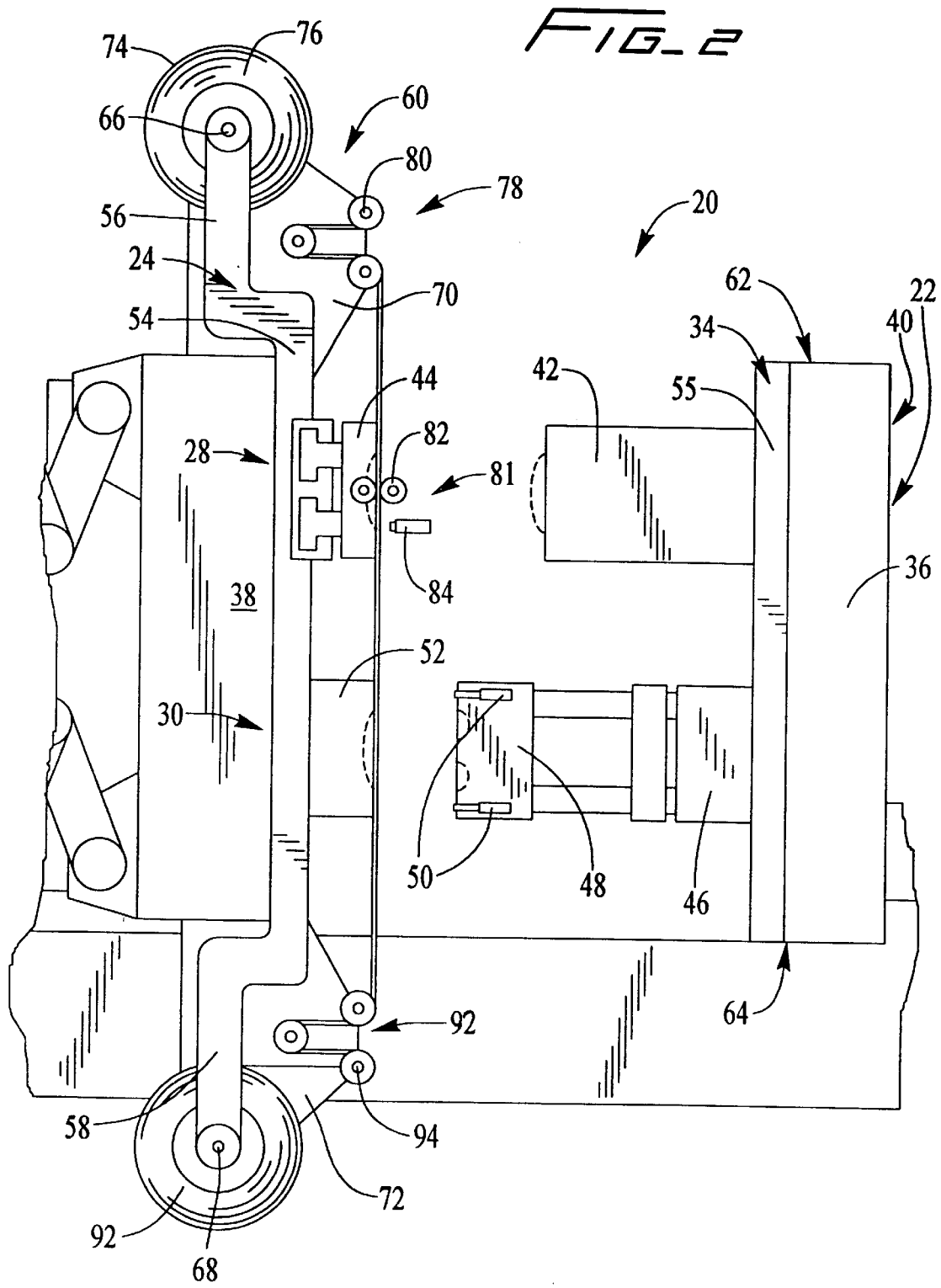

METHOD OF USE OF MULTI-PURPOSE PROCESSING APPARATUS

CROSS-REFERENCE TO RELATED APPLICATIONS

This application is a division of U.S. Application No. 09/411,292, filed Oct. 4, 1999, now U.S. Pat. No. 6,497,567.

BACKGROUND OF THE INVENTION

This invention relates to injection molding, and in particular, to a method of using a multi-purpose processing apparatus or tool for simultaneously performing the multiple functions of forming, cutting, and molding, such as in the process of in-mold decorating.

Typically, a part that requires in-mold decorating may first require multiple steps to be performed. The first step may be to print the part in web form. The web form may then be fed through a web cutting apparatus, which reads a registration mark, thereby cutting the web into sheets or parts at desired locations. The part, in printed and cut form, may be sent to a station where locations are punched. After the punching operation is complete, the part is ready and able to be sent to the former, where it may be hand fed and formed. The formed sheet may then be sent to the injection molding machine, where again individual sheets are manually hand fed to be molded. Finally, the desired product is produced.

The cost of such an operation is considerable. There are the obvious costs of performing each separate operation, as well as the material handling costs between each operation. However, considerable hidden costs exist as well. Such hidden costs include coordinating all of the separate operations involved, i.e., printing, perforating and cutting the part, punching locations, sending the part to a separate station to be formed, and to another separate station to be molded, as well as labor costs, such as the numerous manual operations included therein. Further, these tasks can slow the process, creating troublesome bottlenecks. And the manual nature of these processes can raise quality concerns.

Accordingly, a need exists for a multi-purpose processing apparatus which allows an injection molding operation to proceed without the need to perform the pre-injection molding individual steps such as cutting, punching, and forming. In other words, a need exists for a device which accepts the product in web form, thereby combining pre-injection molding stations into one continuous feed apparatus, which eliminates the manual labor and expense associated with conventional in-mold decorated injection molding. Further, a need exists for a multi-purpose processing apparatus which allows the steps of forming, cutting, and molding to be performed on a printed feed roll simultaneously at different positions within the injection molding machine.

SUMMARY OF THE INVENTION

Therefore, it is an object of the present invention to provide a multi-purpose processing apparatus which allows an injection molding operation to proceed without the need to perform the pre-injection molding individual steps such as cutting, punching, and forming. It is a further object of the present invention to provide a multi-purpose processing apparatus which accepts the printed stock in web form, thereby combining pre-injection molding stations into one continuous feed apparatus, which eliminates the manual labor usually associated with injection molding. Further, it is also an object of the present invention to provide a multi-purpose processing apparatus which allows the steps of forming, cutting, and molding to be performed on a printed feed roll simultaneously at different positions within the injection molding machine.

The present invention satisfies this need by providing a multi-purpose processing apparatus able to perform both a forming operation and a cutting/injection molding operation. Using this multi-purpose apparatus in a manufacturing process eliminates the need for three separate and distinct steps of forming, cutting, and injection molding. Use of the multi-purpose apparatus results in a process which combines the three steps of forming, cutting, and injection molding into one continuous operation performed within the injection molding machine. The multi-purpose apparatus thereby eliminates the need for a punching operation before reaching the injection molding machine to position forming locations, as there is now no need to hand feed the forming operation. This tool allows the three steps of forming, cutting and molding to be performed simultaneously as parts are fed into the multi-purpose apparatus.

The present invention multi-purpose processing apparatus fits into a substantially conventional injection molding machine. The apparatus is preferably mounted on a quick change mounting plate, but may be mounted directly to both press platen surfaces of the injection molding machine. The multi-purpose apparatus has a first portion which performs the forming operation and a second portion which performs the cutting and molding operation.

The forming operation is typically done by pressure forming. The forming operation utilizes unused space within the injection molding machine, as well as clamping pressure already supplied by the injection molding machine. The injection molding operation is typical as is known in the art. For the cutting portion, the part can be pattern-cut while in the mold, preferably by cutting means in the mold cutting the substrate during closing of the mold. The cutting operation is optional, as the tool can be set up to either perform the cutting operation or not, as desired.

In use, the process begins with a roll of a flat, printed web mounted on a roll mount. The web is fed into the multi-purpose processing apparatus by a web feed system. After a portion of the web is formed, it is advanced to the cutting/molding operation within the multi-purpose tool. As the formed portion is cut and molded, a new portion is advanced to the forming operation and formed simultaneously with the portion which was just formed being cut and/or molded. The cutting/molding operation can be set up to either cut or not cut the part. If the cutting/molding operation is not set in a cutting mode, the parts, formed and molded, continue on to be rolled up onto another roll. This process can continue until a new feed roll is needed, forming multiple finished parts without having to transport them after each individual step is completed.

If the cutting/molding operation is set up to perform a cutting operation, simultaneous with the injection molding process the substrate can be pattern-cut, preferably by a cutting means on the tool. The part, now formed, cut, and molded, can generally either fall into a bin, or be picked up by a robot.

As stated earlier, in a conventional in-mold decorated injection molding operation numerous tasks and steps are involved. The present invention allows the printed web to be in roll stock form and be taken directly to the injection molding machine. Therefore, the typical steps required for an in mold decorated part before the part gets to the injection molding machine, i.e., cutting, punching, and forming, are not necessary. Separate cutting and punching operations are no longer required, and the forming operation is performed within the injection molding machine.

Also, as previously mentioned, other hidden costs in a typical process would include such things as coordinating printing, perforating and cutting the part, punching locations, sending the part to the former station to have it formed, and sending the part to the injection molding station to have it molded. With the present invention, the injection molding machine operator can merely track the inventory of printed roll stock on hand, and send notification when more is needed. All of the intermediate operations discussed are no longer required in the process, many of which are manual tasks which are typically slower and less reliable.

In sum, the present invention represents a significant improvement over the prior art in many ways. The multi-purpose processing apparatus in accordance with the present invention allows for multiple operations to be performed within the injection molding machine, permits the elimination of several pre-injection molding machine operations, and overcomes the disadvantages of the prior art. These and other objects and advantages of the present invention will become apparent from the detailed description and accompanying drawings.

DESCRIPTION OF THE DRAWINGS

FIG. 2 is a fragmentary side view of the injection molding machine of FIG. 1, showing the multi-purpose processing apparatus in greater detail.

DESCRIPTION OF THE PREFERRED EMBODIMENTS

Figure 1:
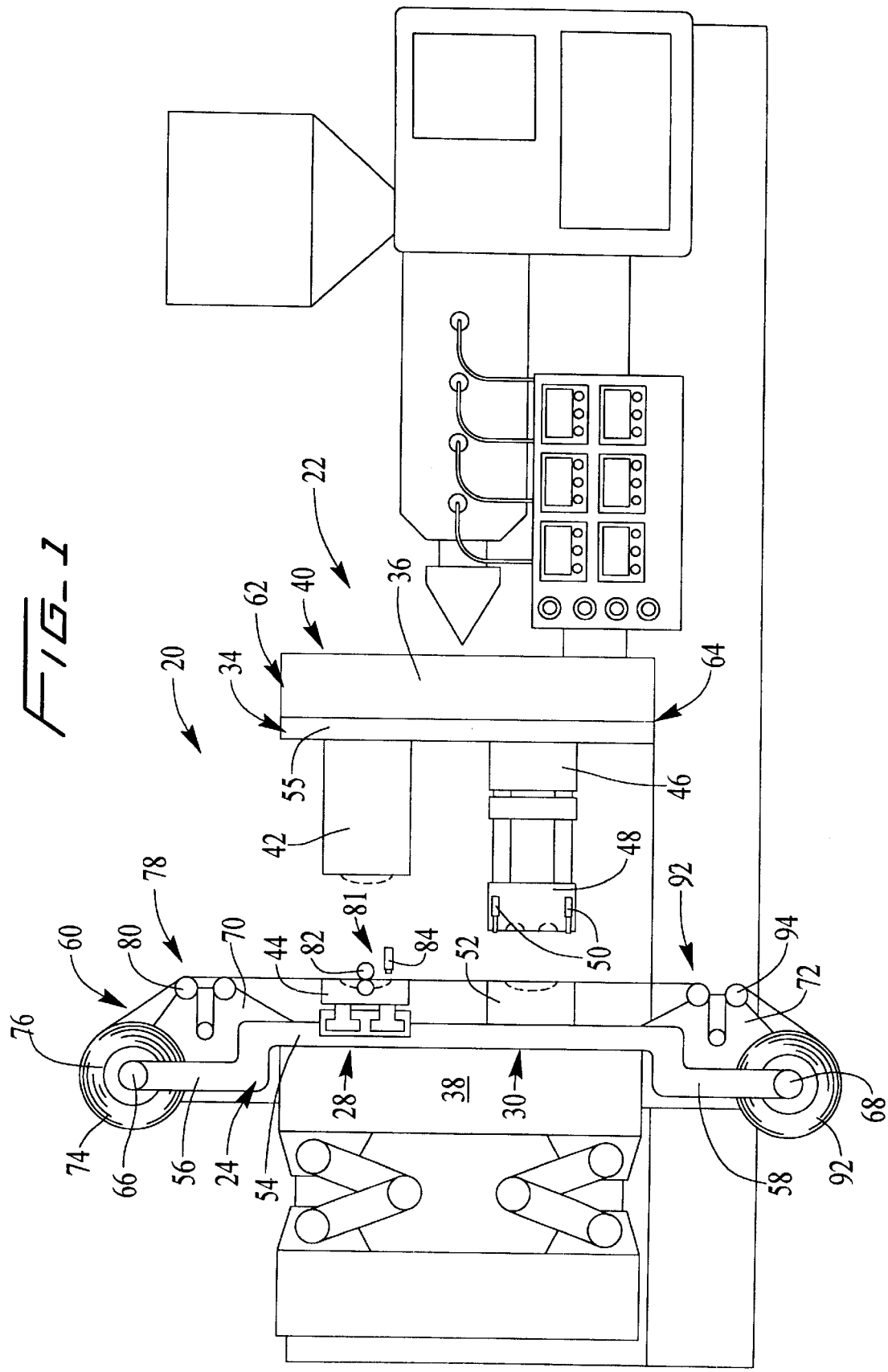
FIG. 1 is a side view of an injection molding machine including a multi-purpose processing apparatus constructed according to a preferred embodiment of the present invention.

The present invention pertains to a multi-purpose processing apparatus 20, shown generally in FIG. 1. The present invention is a multi-purpose apparatus able to perform both a forming operation and a cutting/injection molding operation. Using this apparatus in the manufacturing process eliminates the need for three separate and distinct steps of forming, cutting, and injection molding, as well as eliminating pre-injection molding steps and costs.

The multi-purpose processing apparatus 20 is mounted into an injection molding machine 22, the injection molding machine being one as is known in the art, such as those manufactured by Van Dorn Demag Corporation, Cincinnati Milacron, Inc., or Engel Machinery, Inc. The multi-purpose apparatus 20 is preferably mounted on a quick change mounting plate 24, 34. The multi-purpose apparatus 20 may alternatively be mounted directly to both press platen surfaces 36, 38. The multi-purpose apparatus 20 has a forming portion 28 performing a forming operation and a cutting/molding portion 30 performing a simultaneous cutting and molding operation. The quick change mounting plate has both a stationary mounting plate 34 and a movable mounting plate 24. The stationary mounting plate 34 is mounted to the stationary press platen 36 of the injection molding machine 22, while the movable mounting plate 24 is mounted to the movable press platen 38 of the injection molding machine 22.

The forming portion 28 is positioned generally at the upstream side 40 of the injection molding multi-purpose apparatus 20. It has a form die male component 42 and a form die female component 44. The form die male and female components 42 and 44 are mounted respectively to the stationary mounting plate 34 and the movable mounting plate 24. In the most preferred embodiment, form die male component 42 is mounted to the stationary mounting plate 34 while form die female component 44 is mounted to the movable mounting plate 24. The form die female component 44 may include a generally conventional Z axis ejector (not shown) actuated, typically, either hydraulically, electrically or pneumatically, or spring-loaded, to eject formed sheets.

The cutting/molding portion 30 is typically positioned downstream from the forming portion 28. In the most preferred embodiment, to perform the molding operation, the cutting/molding portion 30 has a mold front half 46, a mold center plate 48 with spring-loaded ejectors 50, and a mold back half 52, as are typical in most injection molding apparatus. The purpose of the spring loaded ejectors 50 is to move the molded and cut part off the mold, to allow it to move to the next step or be removed. Ejectors 50 have the further purpose to keep the waste (the portion of mold material outside the intended final product), which is cut off in the process, with the mold back half 52. In the embodiment shown, the mold front half 46 is mounted to the stationary mounting plate 34. The mold center plate 48 is then mounted to the mold front half 46. The mold back half 52 is mounted to the movable mounting plate 24. As is known in the art of injection molding, the mold components, generally constructed of steel, are held closed. Granular plastic, melted to between 400° and 750° Fahrenheit, is forced between the halves. The mold halves are separated after the parts cool.

Generally the cutting operation is performed by the mold closing steps such that the substrate is pattern-cut by simply closing the mold.

The movable mounting plate 24 is a standard mounting plate for use in injection molding machines. In the embodiment shown, the stationary mounting plate 34 is rectangular in shape. The movable mounting plate 24 has a rectangular-shaped portion 54 substantially identical to the rectangular portion 55 of the stationary mounting plate 34. The mounting of the movable mounting plate 24 to the movable press platen 38 is directly opposite the stationary mounting plate 34. The movable mounting plate 24 has extensions 56, 58, one on each end, to adapt the movable mounting plate for use with the multi-purpose apparatus 20. As stated, the multipurpose apparatus 20 is mounted to the quick change mounting plates 24 and 34. Also depending from the movable mounting plate 24 are multiple components which allow the multi-purpose apparatus 20 to operate effectively and efficiently.

The components of a web feed system 60 are located and mounted to the movable mounting plate 24. Therefore, when a job is complete, if desired, the entire system can be removed from the injection molding machine 22 in very minimal time, generally a few minutes. This removability feature provides the added advantage that the multi-purpose apparatus 20 remains out of the way when not in use, to avoid being damaged or bumped during instances such as other mold runs. This is a consideration, for example, because of the very sensitive components of the feed system 60. This feature allows service work to the apparatus 20 to be more easily completed as well.

The web feed system 60 includes extensions 56, 58 on each end of the rectangular-shaped portion 54 of the movable mounting plate 24. Extensions 56, 58 are typically L-shaped, as shown in FIG. 2. There is a top extension 56 located outside the top 62 of the injection molding machine 22, and a bottom extension 58 located outside the bottom 64 of the injection molding machine. The top extension 56 has a top roll mount 66 located at its end, as does the bottom extension 58 have a bottom roll mount 68 located at its end.

Depending from one side of the top extension 56 is a top support plate 70. The top support plate extends down from the approximate location of the top roll mount 66 to the side of the injection molding machine 22. The bottom extension 58 also has a bottom support plate 72 in a similar position. A supply reel 74 of printed stock 76 in roll form, to be formed, cut, and molded, is to be attached to the top roll mount 66. An end reel 92 depends from the bottom extension 58 to be used after the multi-purpose apparatus 20, to collect the waste if cutting is done, or to retain the molded parts, still in web form, if cutting is disabled.

Depending from the top support plate 70 are tensioning mechanisms 78. The tensioning mechanisms may be a number of rollers 80, for example three, positioned as in FIG. 2, to keep tension in the printed stock 76 as it is fed from the supply reel 74 through the multi-purpose apparatus 20. Tensioning mechanisms 98 also depend from the bottom support plate 72, to further assist in keeping tension in the printed stock 76. These tensioning mechanisms 98 may also be a number of rollers 94.

In the most preferred embodiment, the web feed system 60 also includes a monitoring device 81, to improve alignment. The monitoring device includes nip roller heads 82 on each side of the forming dies 42, 44. The nip roller heads 82 adjust the location of the printed stock 76 in and out or up and down, generally a few thousands of an inch, as the printed stock enters the forming portion 28 so that it is properly placed within the injection molding machine 22. The monitoring device further includes an electronic photo eye 84, which is also mounted to the apparatus 20, such as at rectangular-shaped portion 54, to read registration marks (not shown) on the printed stock 76 as it proceeds through the multi-purpose apparatus 20. The photo eye 84, in combination with the nip roller heads 82, control the X, Y, and skew alignment of the printed stock located within the injection molding multi-purpose apparatus 20.

The photo eye 84 reads the registration marks, and therefore signals when a part to be formed is in proper position. The forming is typically done by pressure forming. The pressure forming could be a cold forming operation where the printed stock 76, not having been heated in any way, is fed through the form die male-female matched components 42, 44. The clamping pressure then performs the forming step as desired. By performing the forming operation within the injection molding machine 22, the clamping pressure already supplied by the injection molding machine is taken advantage of.

After the forming operation, the printed stock 76 is advanced further, thereby feeding the just-formed part forward into the molding/cutting portion 30 and a non-formed part into the forming portion 28. The just-formed part is then molded in the cutting/molding portion 30, as is known in the art, while the newly advanced portion of the printed stock 76 into the forming portion 28 is simultaneously formed.

After a part is formed, an electronic photo eye 84 may no longer be required. The part already formed can be nestled into the mold back half 52 of the molding/cutting portion 30 when the printed stock 76 is advanced to its proper position. Vacuum assistance may be used depending on the depth of the forming. However, the point at which registration is critical is at the forming portion 28. The location of the cutting/molding portion 30 will be adjusted so to locate properly the formed part. The formed part will have the ability to also be nestled into the mold back half 52 as the advancing printed stock is being positioned into the forming portion 28. The adjustment of the location of cutting/molding portion 30, generally about 0.005 inches, also takes into consideration that the thin material may buckle at times. A vacuum may also be used to assist sucking the part into the mold back half.

In use of the multi-purpose apparatus 20, the process begins with a supply reel 74 of a flat, printed stock 76 mounted on the top roll mount 66 of the web feed system 60. The printed stock is printed with a registration mark (not shown). The printed stock is fed through a tensioning mechanism 78 and into the injection molding machine 22. The printed stock 76 advances through nip roller heads 82. In the most preferred embodiment an electronic photo eye 84 picks up a registration mark, which synchronizes the printed image (not shown) to the location of the form die components 42, 44, which will in turn further form (i.e., emboss) the printed stock 76 to the desired height. The press will then open, and the printed stock 76 will advance down. The electronic photo eye 84 will then pick up on the next registration mark, again placing the newly advanced portion of the printed stock in the correct position for the forming portion 28. The injection molding press will then again close. The press forms in the forming portion 28, and in the meantime, simultaneously cuts and injection molds the previously formed part of the printed stock 76 in the cutting/molding portion 30.

As discussed earlier, the cutting function of the cutting/molding portion 30 does not have to be enabled. If, however, the cutting/molding portion 30 has the cutting operation enabled, simultaneous with the injection molding process the substrate can be pattern-cut, preferably by a cutter or cutting edge on the cutting/molding portion of the multi-purpose apparatus 20. The cut part can either fall into a bin, or be picked up by a robot. Several conventional molding presses already possess this robotic pickup facility. The entire process, whether the printed stock is being cut or not, can continue until a new supply reel 74 of printed stock 76 is needed. Thus, numerous finished parts are completed without having to transport them after each individual step is completed.

In the cutting operation, as stated, the substrate is pattern-cut while in the cutting/molding portion 30, preferably by cutting means in the mold cutting the printed stock substrate during closing of the mold, as is known in the art. The printed stock substrate pattern-cutting step is performed by the mold closing step such that the substrate is pattern-cut by simply closing the mold. Preferably, the printed stock substrate is cut during the mold closing step by compressing and cold flowing the substrate to separate the substrate along a designated cut-line. The substrate is engaged along the designated cut-line between opposing designated mold surfaces during the mold closing step to pinch the substrate along the designated cut-line, and the mold continues to close to compress the substrate at the designated cut-line between the designated mold surfaces and cold-flow the substrate from the designated cut-line in a direction generally lateral to the mold closing direction.

Pressure forming can be a highly efficient and effective method to use. This is because the forming operation being done within the injection molding machine takes advantage of the unused space in the injection molding machine, as well as the clamping pressure of the injection molding machine. Heated tool forming can also be used. This is done by utilizing conventional heating and cooling circuits (not shown) to heat the tooling used in the forming operation.

Although the invention has been herein shown and described in what is perceived to be the most practical and preferred embodiments, it is to be understood that the invention is not intended to be limited to those specific embodiments. Rather, it is recognized that modifications may be made by one of skill in the art without departing from the spirit or intent of the invention. Therefore, the invention is to be taken as including all reasonable equivalents to the subject matter of the appended claims.

We claim:

1. A method of forming, cutting, and injection molding a printed stock in web form, the method comprising the steps of:

forming a first portion of the printed stock within a forming portion of an injection molding machine;

advancing the first portion of the printed stock after it has been formed into an injection molding portion of the injection molding machine and a second portion of the printed stock into the forming portion of the injection molding machine;

injection molding the first portion of the printed stock and simultaneously cutting the first portion of the printed stock within the injection molding portion of the injection molding machine; and forming the second portion of the printed stock within the forming portion of the injection molding machine while simultaneously cutting and injection molding the first portion of the printed stock within the injection molding portion of the injection molding machine.

2. The method of claim 1 further comprising the step of cutting the first portion of the printed stock within a cutting portion of the injection molding machine, substantially simultaneously with the forming and injection molding steps.

3. The method of claim 2, wherein the printed stock is advanced through the injection molding machine by a web feed system.

4. A method of forming and injection molding a printed stock in web form, the method comprising the steps of:

forming a first portion of the printed stock within a forming portion of an injection molding machine;

advancing the first portion of the printed stock after it has been formed into an injection molding portion of the injection molding machine and a second portion of the printed stock into the forming portion of the injection molding machine;

injection molding the first portion of the printed stock within the injection molding portion of the injection molding machine; and forming the second portion of the printed stock within the forming portion of the injection molding machine while simultaneously injection molding the first portion of the printed stock within the injection molding portion of the injection molding machine.

5. The method of claim 4 further comprising the step of rolling the printed stock after the printed stock is injection molded.

6. The method of claim 4 further comprising the step of cutting the printed stock within the injection molding portion of the injection molding machine.

* * * * *